J. W. ZUZIK.
ATTACHMENT FOR REAPER RAKES.
APPLICATION FILED AUG. 5, 1914.
1,132,820.
Patented Mar. 23, 1915.
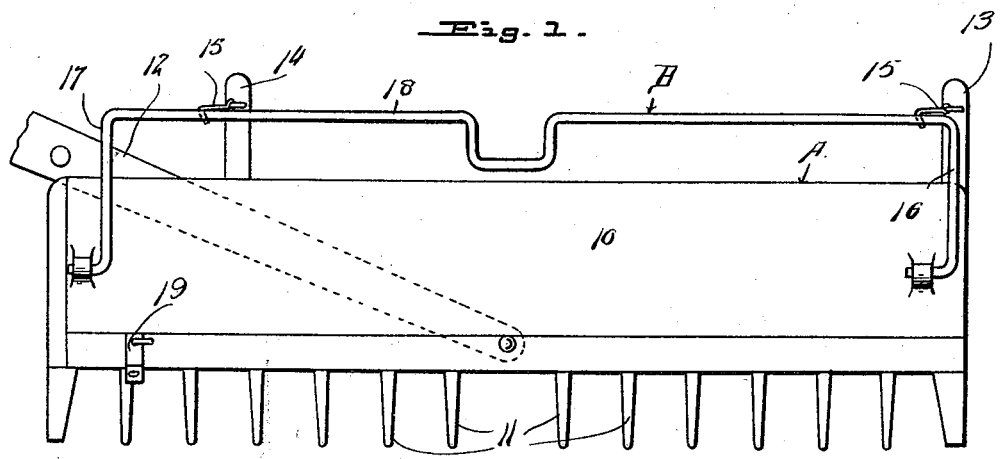
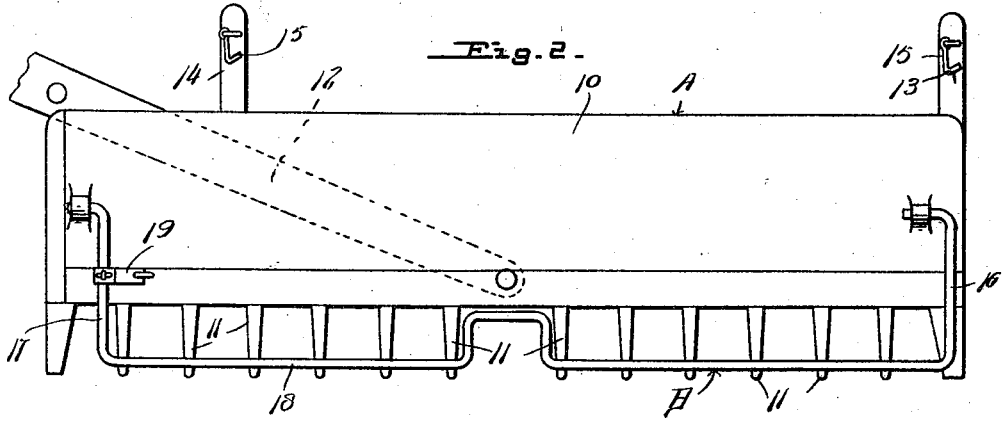
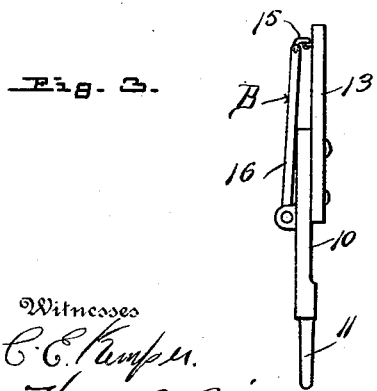
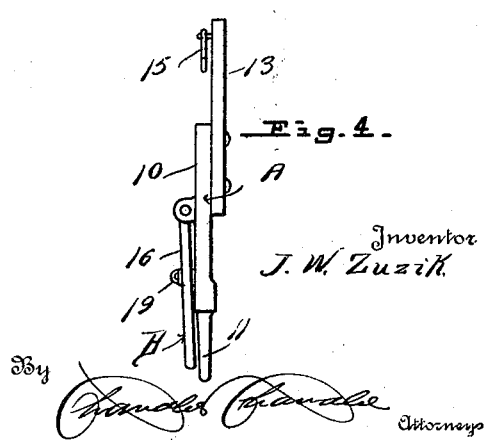
Inventor
J. W. Zuzik.

UNITED STATES PATENT OFFICE.

JOHN W. ZUZIK, OF STILLWATER, NEW YORK.

ATTACHMENT FOR REAPER-RAKES.

1,132,820.   Specification of Letters Patent.   Patented Mar. 23, 1915.

Application filed August 5, 1914. Serial No. 855,268.

*To all whom it may concern:*

Be it known that I, JOHN W. ZUZIK, a citizen of the United States, residing at Stillwater, in the county of Saratoga, State of New York, have invented certain new and useful Improvements in Attachments for Reaper-Rakes; and I do hereby declare the following to be a full, clear, and exact description of the invention, such as will enable others skilled in the art to which it appertains to make and use the same.

This invention relates to attachments for reaper rakes.

The object of the invention resides in the provision of an attachment for reaper rakes which can be adjusted so as to render the rake fully efficient when operating upon short grain.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a view in elevation of a reaper rake having the attachment associated therewith and disposed in the position it would occupy when long grain is being operated upon; Fig. 2, a view similar to Fig. 1 with the attachment adjusted to maintain the efficiency of the rake when the latter is operating upon short grain; Fig. 3, an end view of what is shown in Fig. 1, and Fig. 4, an end view of what is shown in Fig. 2.

Referring to the drawings A indicates generally a reaper rake which includes a head 10 and teeth 11 mounted in the head. Secured to the head 10 is the usual arm 12 whereby the rake is attached to the reaper in the usual and well known manner. Secured to the head 10 adjacent respective ends thereof are arms 13 and 14 carrying hooks 15 respectively adjacent their free ends. Pivoted on the head 10 is a U-shaped member B including arms 16 and 17, and an arm connecting portion 18. When it is desired to operate upon long grain the member B is swung so as to engage the arm connecting portion 18 against the arms 13 and 14 when the hooks 15 are secured through said arm connecting portion. When it is desired to operate upon short grain the member B is positioned as shown in Fig. 2 with the arm connecting portion 18 disposed against the teeth 11 a short distance inward of the outer end of said teeth. When the member B is positioned as shown in Fig. 2 it is secured against pivotal movement by means of suitable fastening devices 19 mounted on the head 10.

What is claimed is:—

The combination with a reaper rake including a head and a plurality of teeth mounted therein, spaced arms carried by said head and directed oppositely to the teeth, a U-shaped member having its arms pivotally connected to the head and adapted to swing to dispose its arm connecting portion against either said first mentioned arms or said teeth, and means for holding said U-shaped member against pivotal movement in either position.

In testimony whereof I affix my signature, in the presence of two witnesses.

JOHN W. ZUZIK.

Witnesses:
 JOHN ZUZIK,
 ALX. SANDENLOR.

Copies of this patent may be obtained for five cents each, by addressing the "Commissioner of Patents, Washington, D. C."